United States Patent Office 3,699,116
Patented Oct. 17, 1972

3,699,116
2,2'-AZINES OF 2,4-THIAZOLIDINEDIONES
Alex Meisels, Basel, and Emilio Schott, Riehen, Switzerland, assignors to Ciba-Geigy Corporation, Ardsley, N.Y.
No Drawing. Continuation-in-part of abandoned application Ser. No. 587,996, Oct. 20, 1966. This application Oct. 1, 1969, Ser. No. 862,936
Claims priority, application Switzerland, Oct. 29, 1965, 14,985/65; July 17, 1969, 10,911/69
Int. Cl. C07d 91/18
U.S. Cl. 260—306.7          20 Claims

ABSTRACT OF THE DISCLOSURE 2,2'-azines of 2,4-thiazolidinediones are useful for the inhibition of the growth of tumors. An illustrative embodiment is the 2,2'-azine of 3,5-dimethyl-2,4-thiazolidinedione and 3-(2-methylallyl)-2,4-thiazolidinedione, 2,4-thiazolidinedione-2-(3-thiosemicarbazones) are useful as intermediates in their production.

CROSS REFERENCE

This is a continuation-in-part of copending application Ser. No. 587,996 filed Oct. 20, 1966, now abandoned.

DETAILED DESCRIPTION

The present invention relates in a first aspect to 2,2'-azines of 2,4-thiazolidinediones and in a second aspect to intermediate 2,4 - thiazolidinedione-2-(3 - thiosemicarbazones) useful for the production thereof.

More particularly, the present invention in its first aspect relates to compounds of the formula

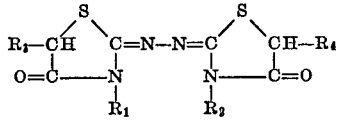
(I)

wherein $R_1$ is hydrogen, methyl, allyl, 2-methylallyl or 2-propinyl;
$R_2$ is alkenyl having 3 to 4 carbon atoms, 2-cyclohexenyl or 2-propinyl; and
each of $R_3$ and $R_4$ independent of each other is hydrogen or methyl.

By the phrase "alkenyl having 3 to 4 carbon atoms" is meant a nonterminally unsaturated hydrocarbon such as allyl, 1-methylallyl, 2-methylallyl, 2-butenyl (crotyl), or 3-butenyl.

Typical members of the present invention are those compounds of Formula I wherein:

(a) $R_1$ is hydrogen, $R_2$ is 1-methylallyl and each of $R_3$ and $R_4$ is hydrogen
(b) $R_1$ is hydrogen, $R_2$ is 1-methylallyl and each of $R_3$ and $R_4$ is methyl;
(c) $R_1$ is methyl, $R_2$ is 1-methylallyl and each of $R_3$ and $R_4$ is methyl;
(d) $R_1$ is methyl, $R_2$ is allyl, and each of $R_3$ and $R_4$ is hydrogen;
(e) $R_1$ is methyl, $R_2$ is allyl and each of $R_3$ and $R_4$ is methyl;
(f) $R_1$ is allyl, $R_2$ is allyl and each of $R_3$ and $R_4$ is hydrogen;
(g) $R_1$ is hydrogen, $R_2$ is 2-methylallyl and each of $R_3$ and $R_4$ is methyl;
(h) $R_1$ is methyl, $R_2$ is 2-methylallyl, and each of $R_3$ and $R_4$ is methyl;
(i) $R_1$ is hydrogen, $R_2$ is cyclohenyl and each of $R_3$ and $R_4$ is methyl;
(j) $R_1$ is allyl, $R_2$ is 2-methylallyl and each of $R_3$ and $R_4$ is hydrogen;
(k) each of $R_1$ and $R_2$ is 2-propinyl, and each of $R_3$ and $R_4$ is methyl;
(l) $R_1$ is methyl, $R_2$ is allyl, $R_3$ is hydrogen and $R_4$ is methyl;
(m) $R_1$ is methyl, $R_2$ is 2-methylallyl, $R_3$ is hydrogen and $R_4$ is methyl;
(n) $R_1$ is methyl, $R_2$ is 2-propinyl, and each of $R_3$ and $R_4$ is hydrogen;
(o) $R_1$ is methyl, $R_2$ is 2-methylallyl, $R_3$ is methyl and $R_4$ is hydrogen;
(p) $R_1$ is allyl, $R_2$ is 2-methylallyl, $R_3$ is methyl and $R_4$ is hydrogen;
(q) $R_1$ is methyl, $R_2$ is allyl, $R_3$ is methyl and $R_4$ is hydrogen;
(r) $R_1$ is allyl, $R_2$ is allyl, $R_3$ is methyl and $R_4$ is hydrogen;
(s) each of $R_1$ and $R_2$ is 2-methylallyl, and each of $R_3$ and $R_4$ is hydrogen.

In its second aspect, the present invention concerns the valuable chemical intermediates of the formula

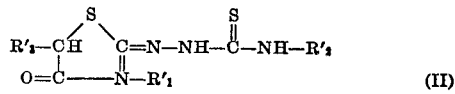
(II)

wherein $R_1'$ is methyl, allyl, 2-methylallyl or 2-propinyl,
$R_2'$ is hydrogen, methyl, alkenyl having 3 to 4 carbon atoms or cyclohexenyl; at least one of the symbols $R_1'$ and $R_2'$ being an unsaturated group; and
$R_3'$ is hydrogen or methyl.

Typical compounds of Formula II are those wherein:

$R_1'$ is methyl, $R_2'$ is allyl and $R_3'$ is methyl;
$R_1'$ is methyl, $R_2'$ is allyl and $R_3'$ is hydrogen;
$R_1'$ is methyl, $R_2'$ is 2-methylallyl and $R_3'$ is hydrogen;
$R_1'$ is allyl, $R_2'$ is 2-cyclohexenyl and $R_3'$ is methyl;
$R_1'$ is allyl, $R_2'$ is 2-methylallyl and $R_3'$ is hydrogen;
$R_1'$ is methyl, $R_2'$ is 2-methylallyl and $R_3'$ is methyl;
$R_1'$ is allyl, $R_2'$ is methyl and $R_3'$ is methyl;
$R_1'$ is allyl, $R_2'$ is 2-methylallyl and $R_3'$ is methyl;
$R_1'$ is allyl, $R_2'$ is allyl and $R_3'$ is methyl;
$R_1'$ is allyl, $R_2'$ is hydrogen and $R_3'$ is hydrogen;
$R_1'$ is 2-methylallyl, each of $R_2'$ and $R_3'$ is methyl.

The compounds of Formula I have been found to have tumor growth inhibiting properties. Their therapeutic index is favorable and no undesirable side effects have been observed. For example, the $LD_{50}$ on subcutaneous administration to mice for the 2,2'-azine of 5-methyl-2,4-thiazolidinedione and of 5-methyl-3-(1-methylallyl)-2,4-thiazolidinedione is higher than 5,000 mg./kg. for a single dose, on oral administration to mice higher than 1,000 mg./kg. for a single dose.

The tumor growth-inhibiting activity of the compounds of Formula I can be conveniently observed in vivo experimental models widely used in the art, e.g. on subcutaneous or oral administration in cases of Walker carcinosarcoma 256 and of carcinoma induced by dimethylbenzanthracene (DMBA carcinoma).

The tests are performed as follows:

(a) Walker carcino-sarcoma 256: Male rats (Wistar or Spraque Dawley strains) weighing 100–120 g. are used. The tumor is transplanted by intramuscular injection of 1 ml. of a mixture consisting of a tumor cell suspension and Ringer or Hanks solution (1 g. of tumor cell suspension and 1 ml. of Ringer or Hanks solution) into the left thigh. Treatment with the test compounds starts 20 hours thereafter. The test compounds are given either subcutaneously on the right side or orally daily on 4 consecutive days. The animals are sacrificed 10 to 12 days after the tumor transplantation. The weight of the tumors of the treated animals and the untreated controls are determined. The results are expressed in percent inhibition of the growth of the tumors (weight) as compared to the untreated controls.

(b) Dimethylbenzanthracene (DMBA) induced carcinoma: Female rats (strain "Sprague Dawley") being 50 days old are used. The tumor is induced by application of a solution of 15 mg. of dimethylbenzanthracene in 1 ml. of sesame oil orally via an esophageal sound. About 8 weeks thereafter a mamma carcinoma is formed. Only the animals having a tumor diameter of 8 to 12 mm. are used in the test. These rats are randomly divided into groups of seven animals. A group obtains either orally or subcutaneously on the right side on five consecutive days during three consecutive weeks a certain dose of the test compound. The animals are sacrificed ten days after the last dose is given; the diameters of the tumors are determined and the results expressed in percent inhibition of the tumor growth (diameter) of the untreated controls.

In order to have an indication of the toxicity of the test compounds, the maximal tolerated dose (dt max.) is determined in mice with one single subcutaneous administration and observation during 10 days.

To prepare the azines of Formula I, a compound of the formula

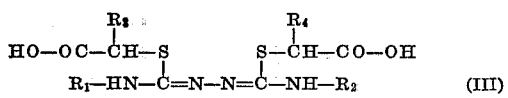

$$\text{HO-OC-CH-S} \quad \text{S-CH-CO-OH}$$
$$R_1\text{-HN-C=N-N=C-NH-}R_2 \quad \text{(III)}$$

wherein $R_1$, $R_2$, $R_3$ and $R_4$ have the meanings given in Formula I, or a functional derivative thereof with regard to one or both carboxyl functions, or the tautomeric form thereof, is exposed to ring closing conditions, for example, at a raised temperature. The compounds of Formula III or their functional derivatives are produced in their turn by reacting a 2,5-dithio-biurea (N,N'-bis-thiocarbamoyl-hydrazine) of the Formula IV

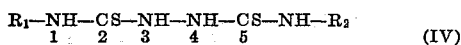

$$R_1\text{-NH-CS-NH-NH-CS-NH-}R_2 \quad \text{(IV)}$$

wherein $R_1$ and $R_2$ have the meanings given in Formula I, or a dibasic salt, particularly an alkali metal salt, of a tautomeric form of such 2,5-dithio-biurea of Formula IV, with double the molar amount of a reactive ester, with regard to the hydroxyl function, of an α-hydroxy-alkanoic acid of Formula V

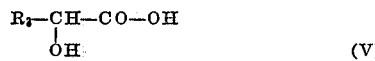

$$R_3\text{-CH-CO-OH}$$
$$\text{OH} \quad \text{(V)}$$

wherein $R_3$ has the meaning given in Formula I, or with a functional derivative thereof with regard to its carboxyl function. As compounds of the Formula III are converted into end products of Formula I easily and without additional condensing agents, a preferred embodiment of the process according to the invention consists of reacting at raised temperatures directly, i.e. without isolating the intermediate product of Formula III, a compound of Formula IV or a dibasic salt of a tautomeric form thereof with at least double the molar amount of an ester, which is reactive with regard to the α-hydroxy function, of an α-hydroxy-alcanoic acid of Formula V or with a functional derivative thereof with regard to its carboxyl function. The salt of a compound of Formula IV is produced, e.g. in situ by the addition of a base or a salt of a weak acid, e.g. by the addition of sodium acetate. The reaction is performed, e.g. in a lower alkanol such as ethanol, propanol or butanol, at temperatures between 50 and 150°, preferably at the boiling temperature of the solvent used. As acid esters of Formula V which are reactive with regard to the hydroxyl function, for example, halogen hydracid and sulfonic acid esters, particularly arene sulfonic acid and methane sulfonic acid esters, i.e. lower 2-halogen-, 2-arene-sulfonyloxy- and methane sulfonyloxy-alkanoic acids, are suitable. Suitable functional derivatives of these esters which are reactive with regard to the carboxyl function are, e.g. the anilides or lower alkyl esters, i.e. lower 2-halogen-, 2-arene-sulfonyloxy- and 2-methane sulfonyloxy-alkanoic acid anilides or the corresponding esters.

Starting materials of Formulas IV and V are known and others can be produced analogously to the known ones.

Compounds of Formula I wherein $R_1$ is the same as $R_2$, and $R_3$ is the same as $R_4$ are obtained according to a second process by reacting a thiazolidinedione or rhodanine of the Formula VI

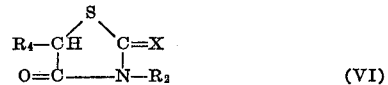

$$\begin{array}{c} S \\ R_4\text{-CH} \diagdown C\text{=X} \\ O\text{=C-----N-}R_2 \end{array} \quad \text{(VI)}$$

wherein X is oxygen or sulfur and $R_2$ and $R_4$ have the meanings given in Formula I, with half the molar amount of a salt of hydrazine. The reaction is preferably performed at a raised temperature, for example by boiling the reaction components in a suitable lower alkanol such as ethanol or butanol.

Compounds of the Formula I, in which $R_1$ is not hydrogen, are prepared according to a third process by reacting an azine of the Formula VII

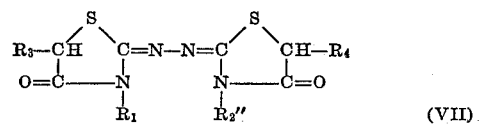

$$R_3\text{-CH} \diagup S \diagdown C\text{=N-N=}C \diagup S \diagdown \text{CH-}R_4$$
$$O\text{=C-----N} \quad N\text{-----C=O}$$
$$\quad\quad R_1 \quad\quad R_2'' \quad \text{(VII)}$$

wherein $R_1$, $R_3$ and $R_4$ have the meanings given under Formula I, and $R_2''$ is hydrogen or has the meaning given for $R_2$ in Formula I—whereby, however, at least one of the symbols $R_1$ and $R_2''$ must be hydrogen—in the presence of an acid binding agent, either with a reactive ester of a compound of Formula VIII

$$R_2\text{-OH} \quad \text{(VIII)}$$

wherein $R_2$ has the meaning given under Formula I, with at least the double molar amount of this ester, if the symbols $R_1$ and $R_2''$ in Formula VII both are hydrogen, or with at least the equimolar amount of this ester, if only one of the two symbols in Formula VII is hydrogen, or reacting with at least the equimolar amount of a reactive ester of a compound of Formula IX.

$$R_1''\text{-OH} \quad \text{(IX)}$$

wherein $R_1''$ has the meaning of $R_1$ in Formula I with the exception of hydrogen, whereby $R_1$ is hydrogen in a compound of Formula VII.

Alkali metal compounds such as sodium or potassium hydroxide, sodium amide, sodium or lithium hydride, for example, serve as acid binding agents. The reactions are performed in suitable organic solvents such as benzene, toluene, dimethyl formamide or, on using alkali hydroxides, also in lower alkanols such as ethanol. The reaction temperatures preferably lie between room temperature and the boiling temperature of the solvent used. Suitable reactive esters of lower alkanols and alkenols are, e.g. their halides, particularly bromides, iodides and chlorides, and sulfonic acid esters such as methane sulfonic acid ester and p-toluene sulfonic acid ester. Also, easily accessible sulfuric acid esters such as dimethyl sulfate and diethyl sulfate can be used.

Compounds of Formula VII containing a hydrogen atom as $R_1$ can be obtained by the first and the fourth process described below for the production of compounds of Formula I, and those containing a hydrogen atom as $R_2''$ can be obtained analogously to these two processes, whereas compounds in which $R_1$ and $R_2''$ are both hydrogen atoms can be obtained analogously to all three of the above processes for the production of compounds of Formula I.

By a fourth process which is particularly useful for the preparation of compounds of Formula I wherein the Groups $R_3$ and $R_4$ are different—instead of a 2,5-dithio-biurea of Formula IV—a thiosemicarbazone of Formulae X or XI

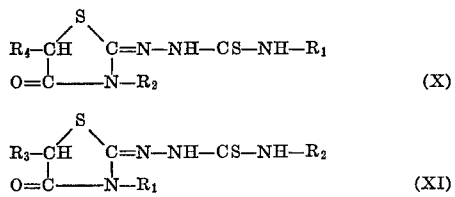

wherein $R_1$, $R_2$, $R_3$ and $R_4$ have the meanings given in Formula I, or a salt of a tautomeric form thereof, is reacted, while heating, with at least the equimolar amount of one of the derivatives of a lower α-hydroxy-alkanoic acid of Formula V defined in the previous process. The reaction can be performed in the same way as when 2,5-dithio-biureas are used.

Thiosemicarbazones of Formulae X and XI are obtained, e.g. by reacting rhodanine or rhodanines substituted in the 3- and/or 5-position corresponding to the definitions of $R_2$ or $R_1$ and/or $R_4$ or $R_3$, with 3-thiosemicarbazides substituted in the 4-position by $R_1$ or $R_2$. Instead of rhodanines unsubstituted in the 3-position, also reactive derivatives thereof can be used, i.e. functional derivatives of the tautomeric mercapto compounds with regard to their mercapto group such as lower 2-(alkoxycarbonylmethyl-thio)-2-thiazolin-4-ones and 2-(alkoxycarbonylmethyl-thio)-5-alkyl-2-thiazolindine-4-ones.

As mentioned above the second aspect of the present inventions are compounds of Formula II. It is apparent that compounds of Formula II fall under the compounds of Formulae X and XI, $R_1'$ and $R_2'$ corresponding to $R_1$ and $R_2$ respectively and $R_3'$ corresponding to $R_3$ and/or $R_4$ respectively.

It has been found that such compounds of Formula II can be prepared by reacting a hydrazone of Formula XII

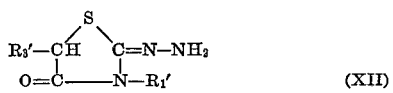

with thiocyanic acid or a derivative of isothiocyanic acid respectively, of Formula XIII $$S=C=N-R_2' \qquad (XIII)$$

in which two Formulas $R_1'$, $R_2'$ and $R_3'$ have the meanings given under Formula II. According to the definition of $R_1'$ and $R_2'$, if desired a thiocyanic acid or a lower alkyliso-thiocyanic acid ester of Formula XIII is only used as starting material if in the hydrazone of Formula XII $R_1'$ is either an alkenyl having three to four carbon atoms or 2-propinyl. The reaction is preferably done in an organic solvent inert to hydrazines e.g. in a lower alkanol such as methanol, ethanol, propanol or isopropanol, in either type solvents such as diethylether, dibutylether, tetrahydrofuran or dioxane, in hydrocarbons such as benzene, toluene or hexane or in a halogenated hydrocarbon such as chloroform, at room temperature or slightly raised temperatures up to about 100° or at boiling temperature of the solvent used. The reaction time is, dependent on the reaction temperature and the reactivity of the starting material, between about ½ and 24 hours.

If as starting material of Formula XIII, thiocyanic acid is used, it is preferably liberated in water from one of its salts—e.g. from the ammonium, sodium or potassium thiocyanate by either utilising the starting material of Formula XII in the form of an acid addition salt, e.g. the hydrochloride or by adding to the reaction mixture slowly the calculated amount of an acid, such as hydrochloric, sulfuric, phosphoric, perchloric, trichloroacetic or acetic acid.

According to a further process thiosemicarbazones of Formula II, wherein $R_2'$ is hydrogen, are produced by reacting a hydrazone of Formula XIIa—falling under the above defined Formula XII

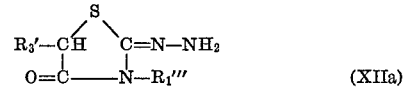

wherein $R_1'''$ is an alkenyl group having 3–4 carbon atoms, or the 2-propinyl group, and $R_3'$ has the meaning given under Formula II, with a cyanogen halide in the presence of an acid binding agent and by further reacting the obtained carbazic acid nitrile of Formula XIV,

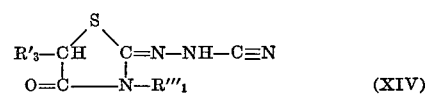

wherein $R_1'''$ and $R_3'$ have the meanings given under Formulae XIIa and II respectively, with hydrogen sulfide or a mono basic salt thereof. The first step in this process can be carried out e.g. in water as reaction medium, at moderately low temperatures preferably between 0° and room temperature utilising alkaline bicarbonates or carbonates, especially sodium carbonate, as acid binding agents, whereby as cyanogen halide preferably cyanogen chloride is used. The latter is passed into the reaction mixture until the corresponding amount of acid binding agent is neutralised by the liberated hydrogen chloride. The desired reaction product of Formula XIV precipitates and is filtered off after termination of the reaction. As cyanogen halide, cyanogen bromide can also be used. Furthermore the reaction can be carried out in an inert organic solvent.

The addition of hydrogen sulfide as the second reaction step is carried out preferably at temperature of between 0° and 50° in an anhydrous lower alkanol such as methanol, ethanol or propanol. The reaction time is between about 5–48 hours. As mono basic salt of hydrogen sulfide—e.g. ammonium hydrogen sulfide can be used.

The starting materials of Formula XII required for both processes for the preparation of compounds of the Formula II are themselves new compounds.

3-substituted as well as 3,5-disubstituted 2,4-thiazoline-dione-2-hydrazones of the Formula XII, wherein $R_1'$ and $R_3'$ have the meanings given thereunder, can be produced by warming N'-alkanoyl derivatives thereof corresponding to the Formula XV

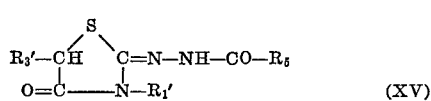

wherein $R_1'$ and $R_3'$ have the meanings given under Formula II and $R_5$ is hydrogen or lower alkyl, particularly methyl, in a lower alkanol and in the presence of hydrogen chloride and, if desired, water. For example, the starting material of Formula XV is refluxed for 1 to 15 hours in a mixture consisting of an anhydrous lower alaknol, particularly ethanol, but also in methanol or propanol and absolute etherical hydrogen chloride, the content of hydrogen chloride being sufficient at least to form a salt with the liberated hydrazone. When the reaction is finished, the mixture is cooled and, if desired, an organic solvent which decreases the solubility of the hydrochloride in the reaction mixture, such as petroleum ether or diethylether is added, whereupon the crystallised hydrochloride of the desired hydrazone of Formula XII is filtered off.

Instead of hydrogen chloride concentrated hydrochloric acid can be used in an amount at least equivalent to the amount of the starting compound of Formula XV, whereby the reaction medium receives a corresponding amount of water.

In this case the reaction is preferably carried out in a lower alkanol such as ethanol at the boiling temperature thereof. The hydrochlorides formed of the hydrazones of Formula XII are at least partially dissolved in this reaction medium and are isolated by evaporation in vacuo. The liberation of the hydrazones from the hydrochlorides can be carried out in a common manner—for example, by dissolving in water, adding the calculated amount of base—e.g. sodium carbonate or sodium hydroxide and extracting the hydrazone, separated as an oil, with an organic solvent or mixture of solvents immiscible with water—e.g. methylene chloride and/or petroleum ether.

Compounds of Formula XV used as starting materials are produced in a simple way by condensing 2-halo fatty acids of the Formula XVI

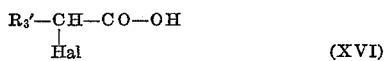

(XVI)

wherein

Hal is chloro, bromo or iodo, and $R_3'$ has the meaning given under Formula II, with 4- substituted 1-alkanoyl-3-thiosemicarbazides of Formula XVII

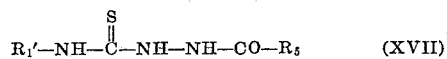

(XVII)

wherein $R_1'$ and $R_5$ have the meanings given under Formula II and Formula XV respectively in the presence of sodium acetate in a lower alkanoyl, particularly ethanol, at the boiling temperature thereof. Instead of 4- substituted 1-alkanoyl-3-thiosemicarbazides also unsubstituted 1-alkanoyl-3-thiosemicarbazides can be used. In this case to the condensation products of the Formula XVIII thus obtained

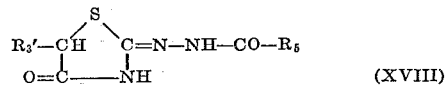

(XVIII)

wherein $R_3'$ and $R_5$ have the meanings given under Formulae II and XV respectively, is introduced the 3-substituent $R_1'$ by reacting an alkali metal derivative of a compound of the Formula XVIII with a reactive ester of an alkanol of the Formula XIX

$R_1'$—OH  (XIX)

wherein $R_1'$ has the meaning given under Formula II. The alkali metal derivatives of compounds of Formula XVIII are obtained for example by the reaction of a compound of Formula XVIII with sodium hydride, lithium or sodium amide in dimethylformamide at a temperature of between 0° and room temperature. They are in the same medium reacted at room temperature or slightly raised temperature with reactive esters of alkanols of the Formula XIX—e.g. halides such as methyl iodide, ethyl-, propyl-, allyl, 2-methyl-allyl, 2-butenyl- or 2-propionyl iodide or bromide, allyl-, 2-methyl-allyl-, 2-butenyl-, or 2-propionyl-chloride, alkanesulfonic acid or arene sulfonic acid esters such as the corresponding methane sulfonic acid and p-toluenesulfonic acid esters or also with dimethylsulfate or diethylsulfate.

Some of the 1-alkanoyl-3-thiosemicarbazides and of the 4-substituted 1-alkanoyl-3-thiosemicarbazides of the Formula XVII are known and others are prepared analogously to the known compounds from 3-thiosemicarbazides and the corresponding 4-substituted 3-thiosemicarbazides by heating with anhydrous formic acid, acetic anhydride or anhydrides of other lower fatty acids, respectively.

Azines of the Formula I wherein $R_1$ is hydrogen are weakly acid substances which can be converted, e.g. into sodium, potassium or lithium salts or into salts with organic bases such as ethylamine, dimethylamine, diethylamine, aminoethanol, diethylaminoethanol, diethanolamine, triethanolamine, ethylenediamine or morpholine. The azines mentioned, therefore, can be dissolved, e.g. in aqueous solutions of inorganic basic substances such as sodium or potassium hydroxide, sodium or potassium carbonate.

For their intended use, i.e. the inhibition of tumor growth, the compounds of Formula I are administered orally or parenterally, particularly intramuscularly and subcutaneously, in amounts depending on the species, and the age, weight and the particular condition of the individual being treated.

The azines of the present invention are administered parenterally or orally to achieve a tumor growth inhibiting effect, in any of the usual pharmaceutical forms. These include solid and liquid unit oral dosage forms such as tablets, capsules, powders, suspensions, solutions, syrups and the like, including sustained release preparations, and fluid injectable forms such as sterile solutions and suspensions. The term dosage unit form as used in this specification refers to physically discrete units to be administered in single or multiple dosage to animals, each unit containing a predetermined quantity of active material in association with the required diluent, carrier or vehicle. The quantity of active material is that calculated to produce the desired therapeutic effect upon administration of one or more of such units.

Powders are prepared by comminuting the compound to a suitably fine size and mixing with a similarly comminuted diluent pharmaceutical carrier such as an edible carbohydrate material as for example, starch. Sweetening, flavoring, preservative, dispersing and coloring agents can also be added.

Capsules are made by preparing a powder mixture as described above and filling formed gelatin sheaths. A lubricant such as talc, magnesium stearate and calcium stearate can be added to the powder mixture as an adjuvant before the filling operation; a glidant such as colloidal silica may be added to improve flow properties; a disintegrating or solubilizing agent may be added to improve the availability of the medicament when the capsule is ingested.

Tablets are made by preparing a powder mixture, granulating or slugging, adding a lubricant and disintegrant and pressing into the desired form. A powder mixture is prepared by mixing the compound, suitably comminuted, with a diluent or base such as starch, sucrose, kaolin, dicalcium phosphate and the like. The powder mixture can be granulated by wetting with a binder such as syrup, starch paste, acacia mucilage or solutions of cellulosic or polymeric materials and forcing through a screen. As an alternative to granulating, the powder mixture can be run through the tablet machine and the resulting imperfectly formed slugs broken into granules. The granules can be lubricated to prevent sticking to the tablet forming dies by means of the addition of stearic acid, a stearate salt, talc or mineral oil. The lubricated mixture is then compressed into tablets. The medicaments can also be combined with free flowing inert carriers and compressed into tablets directly without going through the granulating or slugging steps. A protective coating consisting of a sealing coat of shellac, a coating of sugar or polymeric material and a polish coating of wax can be provided. Dyestuffs can be added to these coatings to distinguish different unit dosages.

Oral fluids such as syrups and elixirs can be prepared in unit dosage form so that a given quantity, e.g., a teaspoonful, contains a predetermined amount of the compound. Syrups can be prepared by dissolving the compound in a suitably flavored aqueous sucrose solution while elixirs are prepared through the use of a non-toxic alcoholic vehicle. Suspensions and emulsions can be formulated by dispersing the medicament in a non-toxic vehicle.

For parenteral administration, fluid dosage unit forms can be prepared by suspending or dissolving a measured amount of the compound in a non-toxic liquid vehicle suitable for injection such as an aqueous or oleaginous medium. Alternatively a measured amount of the compound is placed in a vial and the vial and its contents are sterilized and sealed. An accompanying vial or vehicle can be provided for mixing prior to administration.

Daily dosages of azines of the Formula I, suitable for inhibiting the growth of tumors in mammals of normal weight, are between 1 mg./kg. and 100 mg./kg. Within these limits the dosages on parenteral administration are generally less than an oral administration. These daily dosages are advantageously administered in the above described dosage unit forms containing 5 to 250 mg. of active substance.

Dosage unit forms for oral administration preferably contain between 1% and 90% of an azine of Formula I. Ampoules for parenteral, particularly intravenous intramuscular or subcutaneous administration contain preferably 0.5–10% of a compound of Formula I in form of an aqueous dispersion. The latter are produced by means of suitable solubility promoters and/or emulsifying agents.

It is to be appreciated that the present description of how to use the present invention is directed at those skilled in the arts of chemistry and pharmacology and should not be construed as a recommendation or encouragement to employ these compounds in humans, either for therapy or experimentation, without compliance with all rules and regulations promulgated under appropriate Federal statutes, particularly Title 21 of the United States Code, and such State requirements as may be applicable. Moreover, and in accordance with accepted scientific practice, any such use should not be undertaken without proper professional supervision and without careful study of all subsequently available information concerning the pharmacological properties of these compounds, whether such information becomes available through the requirements and facilities of Federal or State authorities, through scientific publications, or otherwise.

The following examples will serve to further typify the nature of the present invention, but should not be construed as a limitation on the scope thereof.

Example 1

20.4 g. (0.1 mol) of 1-(1-methylallyl)-2,5-dithiobiurea (N-[(1 - methylallyl) - thiocarbamoyl]-N'-thiocarbamoyl hydrazine) (M.P. 179–181°) (see below), 20.8 g. (0.22 mol) of chloroacetic acid and 20 g. of anhydrous sodium acetate in 100 ml. of ethanol are refluxed for 6 hours. The reaction mixture is then cooled to 0°, the white precipitate is filtered off under suction and washed with a large quantity of water. The 2,2'-azine of 2,4-thiazolidinedione and of 3-(1-methylallyl) - 2,4 - thiazolidinedione which remains melts, after recrystallising twice from acetone/hexane, at 191–192°.

The following compounds are produced analogously:

(a) 2,2'-azine of 2,4-thiazolidinedione and of 3-allyl-2,4-thiazolidinedione, M.P. 240–241°;
(b) 2,2'-azine of 3-methyl-2,4-thiazolidinedione and of 3-(1-methylallyl)-2,4-thiazolidinedione, M.P. 148–149°;
(c) 2,2'-azine of 3-allyl - 2,4 - thiazolidinedione, M.P. 210–211°;
(d) 2,2'-azine of 3-(1-methylallyl)-2,4-thiazolidinedione, M.P. 157–158°;
(e) 2,2'-azine of 2,4-thiazolidinedione and of 3-(2-butenyl)-2,4-thiazolidinedione, M.P. 262–263°;
(f) 2,2'-azine of 2,4-thiazolidinedione and of 3-(2-methylallyl)-2,4-thiazolidinedione, M.P. 225–227°;
(g) 2,2'-azine of 3-methyl-2,4-thiazolidinedione and of 3-(2-methylallyl)-2,4-thiazolidinedione, M.P. 182–183°;
(h) 2,2'-azine of 3-(2-methylallyl)-2,4-thiazolidinedione, M.P. 194–195°;
(i) 2,2'-azine of 2,4-thiazolidinedione and of 3-(1-methyl-2-butenyl)-2,4-thiazolidinedione, M.P. 160–162°.

The 1-(1-methylallyl)-2,5-dithio-biurea necessary as starting material is produced, e.g. as follows:

46 g. (0.5 mol) of thiosemicarbazide, 62 g. (0.55 mol) of 1-methylallyl isothiocyanate (prepared according to O. Mumm and H. Richter, Ber. 73, 852 (1940)) and 2,000 ml. of ethanol are refluxed for 14 hours. The reaction solution is then cooled to 0° and the 1-(1-methylallyl)-2,5-dithio-biurea which crystallises out is filtered off, washed with ethanol and dried.

Example 2

30.6 g. (0.15 mol) of 1-allyl-6-methyl-2,5-dithiobiurea (M.P. 193–194°, produced analogously to the last paragraph of Example 1) and 51 g. (0.3 mol) of chloracetanilide in 2,000 ml. of ethanol are refluxed for 14 hours. On cooling, the 2,2'-azine of 3-allyl-2,5-thiazolidinedione and of 3-methyl-2,4-thiazolidinedione crystallises out of the clear solution. After one recrystallisation from ethanol, it melts at 186–187°.

Example 3

20.4 g. (0.1 mol) of 1-(methylallyl)-2,5-dithiobiurea (see Example 1), 33.6 g. (0.22 mol) of 2-bromo-n-propionic acid and 40 g. of anhydrous sodium acetate in 200 ml. of ethanol are refluxed for 25 hours. After cooling to room temperature, the sodium salts are filtered off, the filtrate is greatly concentrated under water jet vacuum and water is carefully added. The 2,2'-azine of 5-methyl-2,4-thiazolidinedione and of 5-methyl-3-(1-methylallyl)-2,4-thiazolidinedione crystallises out of the solution at 0° and, after recrystallising three times from acetone/hexane, melts at 137–138°.

The following compounds are produced analogously:

(a) 2,2'-azine of 5-methyl-2,4-thiazolidinedione and of 3-allyl-5-methyl-2,4-thiazolidinedione, M.P. 144–145°;
(b) 2,2'-azine of 3-allyl-5-methyl-2,4-thiazolidinedione and of 3,5-dimethyl-2,4-thiazolidinedione, M.P. 167–171°;
(c) 2,2'-azine of 3,5 - dimethyl - 2,4 - thiazolidinedione and of 5-methyl-3-(1-methylallyl)-2,4-thiazolidinedione, M.P. 94–95°;
(d) 2,2'-azine of 3-(2 - butenyl)-5-methyl-2,4-thiazolidinedione and 5-methyl-2,4-thiazolidinedione, M.P. 131–132°;
(e) 2,2'-azine of 3-(2-butenyl)-5-methyl-2,4-thiazolidinedione and 3,5-dimethyl - 2,4 - thiazolidinedione, M.P. 164–165°;
(f) 2,2'-azine of 5-methyl-2,4-thiazolidinedione and 5-methyl-3-(2-methylallyl)-2,4-thiazolidinedione, M.P. 132–133°;
(g) 2,2'-azine of 3,5 - dimethyl - 2,4 - thiazolidinedione and 5-methyl - 3 - (2-methylallyl)-2,4-thiazolidinedione, M.P. 158–159°;
(h) 2,2-azine of 3-(cyclohex - 2 - enyl)-5-methyl-2,4-thiazolidinedione and 5-methyl - 2,4 - thiazolidinedione, M.P. 204°.

Example 4

(a) 2.3 g. (0.01 mol) of 3-allyl-2,4-thiazolidinedione-2-thiosemicarbazone (as described below), 1.04 g. (0.11 mol) of chloroacetic acid and 2 g. of anhydrous sodium acetate are refluxed for 6 hours in 10 ml. of ethanol. The reaction mixture is concentrated at 11 torr and at 45° in a rotary evaporator to approximately 5 ml. and poured onto 20 g. of ice. The precipitated 2,2'-azine of 3-allyl-2,4-thiazolidinedione and 2,4-thiazolidinedione melts at 240–241° after recrystallising twice from chloroform-hexane.

The following compounds are prepared analogously:

2,2'-azine of 3-allyl-5-methyl-2,4-thiazolidinedione and of 3-methyl-2,4-thiazolidinedione, M.P. 166–167°.
2,2'-azine of 3-methyl-2,4-thiazolidinedione and of 3-(2 - methylallyl) - 5 - methyl-2,4-thiazolidinedione, M.P. 154°.
2,2'-azine of 3,5-dimethyl-2,4-thiazolidinedione and of 3-(2-methylallyl)-2,4-thiazolidinedione, M.P. 174–175°.
2,2'azine of 3-allyl-5-methyl-2,4-thiazolidinedione and of 3-(2-methylallyl) - 2,4 - thiazolidinedione, M.P. 178–179°.

2,2'-azine of 3-allyl-2,4-thiazolidinedione and of 3,5-dimethyl-2,4-thiazolidinedione, M.P. 164–166°.

2,2'-azine of 3-allyl-5-methyl-2,4-thiazolidinedione and of 3-allyl-2,4-thiazolidinedione, M.P. 162°.

2,2'-azine of 3-allyl-2,4-thiazolidinedione and of 3-(2-methylallyl)-2-,4-thiazolidinedione, M.P. 172°.

2,2'-azine of 3-allyl-5-methyl-2,4-thiazolidinedione and of 3-(2-cyclohexene-1-yl)-5-methyl-2,4-thiazolidinedione, M.P. 126°.

(b) The 3-allyl-2,4-thiazolidinedione-2-thiosemicarbazone needed as starting material is prepared as follows:

1.73 g. (0.01 mol) of 3-allyl-rhodanine are refluxed for 24 hours with 0.91 g. (0.01 mol) of thiosemicarbazide and 2 g. of anhydrous potassium acetate in 15 ml. of ethanol. After cooling, the reaction mixture is concentrated to approximately 8 ml. in a rotary evaporator at 11 torr and 45°, and poured onto 30 g. of ice. The precipitated 3 - allyl-2,4-thiazolidine-dione-2-thiosemicarbazone is removed by suction, washed with 10 ml. of cold methanol and further reacted without additional purification.

The synthesis of other intermediates are described further below:

Example 5

(a) 1.73 g. (0.01 mol) of 3-allyl-rhodanine are heated for 2 hours to 120° with 0.54 g. (0.011 mol) of hydrazine hydrate, 2 ml. of glacial acetic acid and 10 ml. of triethylene glycol. After cooling, the precipitated 2,2'-azine of 3-allyl-2,4-thiazolidinedione is removed by suction, washed with 10 ml. of cold methanol and recrystallised from chloroform-hexane; M.P. 210–211°.

(b) The 2,2'-azine of 3-(2-butenyl)-2,4-thiazolidinedione, M.P. 194°, is produced in an analogous manner.

Example 6

(a) 2.54 g. (0.01 mol) of 2,2'-azine of 2,4-thiazolidinedione, decomposition approx. 300°, (prepared according to G. Frerichs and P. Förster, Ann. 371, 257 [1909]) are suspended in 15 ml. of absolute dimethyl formamide. 0.46 g. (0.02 mol) of sodium hydride are added while stirring. After development of hydrogen has ceased, 3 g. (0.022 mol) of crotyl bromide are added dropwise and the reaction mixture is stirred for 12 hours at 20–25° and for 15 minutes at 80°. After cooling, the reaction mixture is poured onto 50 g. of ice, the precipitated 2,2'-azine of 3-(2-butenyl)-2,4-thiazolidinedione is removed by suction, washed with 10 ml. of cold methanol and recrystallised from chloroform-hexane, M.P. 194°.

In an analogous manner the following compounds are produced:

(b) 2,2' - azine of 3-(3-butenyl)-5-methyl-2,4-thiazolidinedione, M.P. 97°;

(c) 2,2'-azine of 3-(2-methylallyl)-5-methyl-2,4-thiazolidinedione, M.P. 148°;

(d) 2,2' - azine of 3-propargyl-5-methyl-2,4-thiazolidinedione, M.P. 200°;

(e) 2,2'-azine of 3-allyl-5-methyl-2,4-thiazolidinedione and 3-allyl-2,4-thiazolidinedione, M.P. 162°;

(f) 2,2'-azine of 3-(2-methylallyl)-5-methyl-2,4-thiazolidinedione and 3-(2-methylallyl)-2,4-thiazolidinedione, M.P. 143°.

The 2,2'-azine of 2,4-thiazolidinedione and 5-methyl-2,4-thiazolidinedione, which is needed as starting material is prepared analogously to Example 6 (M.P. 302–304°).

Example 7

(a) 2.84 g. (0.01 mol) of 2,2'-azine of 3-(2-methylallyl) - 2,4 - thiazolidinedione and 2,4-thiazolidinedione (see Example 1(i)) are suspended in 15 ml. of absolute dimethyl formamide. 0.23 g. (0.01 mol) of sodium hydride is added while stirring at 15–20°. After development of hydrogen has ceased, 1.84 g. (0.011 mol) of allyl iodide are added dropwise and the reaction mixture is stirred for 12 hours at room temperature and for 10 minutes at 80°. After cooling, the reaction mixture is poured onto 50 g. of ice, the precipitated 2,2'-azine of 3-allyl-2,4-thiazolidinedione and 3-(2-methylallyl)-2,4-thiazolidinedione is removed by suction, washed with 10 ml. of cold methanol and recrystallised from chloroform-hexane; M.P. 172°.

The following compounds are prepared in an anologous manner:

(b) 2,2'-azine of 3-allyl-5-methyl-2,4-thiazolidinedione and 5-methyl-3-(1-methylallyl) - 2,4 - thiazolidinedione, M.P. 95°;

(c) 2,2'-azine of 3 - (2-methylallyl)-2,4-thiazolidinedione and 3-cyclopentyl-2,4-thiazolidinedione, M.P. 174°;

(d) 2,2'-azine of 3-(3-butenyl)-5-methyl-2,4-thiazolidinedione and 3,5-dimethyl-2,4-thiazolidinedione, M.P. 108°;

(e) 2,2'-azine of 3-propargyl-5-methyl-2,4-thiazolidinedione and 3,5-dimethyl-2,4-thiazolidinedione, M.P. 204°;

(f) 2,2'-azine of 3-methyl-2,4-thiazolidinedione and of 3-(2-propinyl)-2,4-thiazolidinedione, M.P. 263–265°.

Example 8

(a) 474.1 g. of (3.162 mol) of 4-allyl-3-thiosimicarbazide prepared according to G. Pulvermacher and H. Hempel, Ber. 27, 625 (1894), are suspended in 3500 ml. of chloroform and mixed under stirring and cooling with 442.5 g. (4.334 mol) of acetic anhydride. Subsequently the reaction mixture is refluxed with stirring for 2 hours. Then it is cooled in an ice bath to 5°. The precipitated 1-acetyl-4-allyl-3-thiosemicarbazide is filtered under suction, washed with ether and dried in a water jet vacuum for 20 hours at 70°. The yield amounts to 586.6 g. (93.7% of theory), M.P. 131–132°.

In an analogous manner are prepared:
1-acetyl-4-methyl-3-thiosemicarbazide, M.P. 155–156°, 119 g. (81% of theory) starting from 105.2 g. (1 mol) of 4-methyl-3-thiosemicarbazide and 112.3 g. (1.1 mol) of acetic anhydride.

1 - acetyl-4-(2-methylallyl)-3-thiosemicarbazide, M.P. 146–148°, 165 g. (90% of theory) starting from 142.4 g. (0.98 mol) of 4-(2-methylallyl)-3-thiosemicarbazide and 122 g. (1.17 mol) of acetic anhydride.

(b) 155.9 g. (0.90 mol) of 1-acetyl-4-allyl-3-thiosemicarbazide, 158.4 g. (1.035 mol) of 2-bromopropionic acid and 184.6 g. (2.26 mol) of anhydrous sodium acetate are refluxed with stirring for 3 hours in 1090 ml. of absolute ethanol.

Subsequently the mixture is left to cool to 20° and the precipitated inorganic salts are filtered off. The filtrate is concentrated under reduced pressure. The residue is taken up in 500 ml. of methylene chloride and the solution made alkaline to pH 8 with 2-n sodium hydroxide solution. The mixture is well shaken, the methylene chloride solution removed and the aqueous phase extracted a further 3 times with 150 ml. of methylene chloride. The combined methylene chloride solutions are dried over 30 g. of anhydrous magnesium sulfate which is subsequently filtered off. The filtrate is evaporated under reduced pressure and 141.7 g. (69.2% of Theory) of 3-allyl-5-methyl-2,4-thiazolidinedione - 2 - (2-acetyl-hydrazone) are obtained, M.P. 108–110°.

In an analogous manner are prepared:
3-allyl-2,4-thiazolidinedione - 2 - (2-acetyl-hydrazone), M.P. 140.5–141.5-, 4.5 g. (70.3% of theory) starting from 5.2 g. (0.30 mol) 1-acetyl-4-allyl-3-thiosemicarbazide and 3.4 g. (0.036) of chloroacetic acid;

3,5-dimethyl-2,4-thiazolidinedione - 2 - (2-acetyl-hydrazone), M.P. 168–170°, 7.8 g. (78% of theory) starting from 7.4 g. (0.05 mol) 1-acetyl-4-methyl-3-thiosemicarbazide and 7.7 g. (0.05 mol) 2-bromo-propionic acid;

3 - methyl - 2,4 - thiazolidinedione-2-(2-acetyl-hydrazone), M.P. 202–204°, 4.0 g. (71.4% of theory starting from 4.4 g. (0.03 mol) of 1-acetyl-4-methyl-3-thiosemicarbazide and 3.5 g. (0.037 mol) of chloroacetic acid;

5-methyl-3-(2-methylallyl) - 2,4 - thiazolidinedione-2-(2-acetyl-hydrazone), M.P. 104–107°, 62.8 g. (65.1% of theory starting from 74 g. (0.40 mol) 1-acetyl-4-(2-methylallyl)-3-thiosemicarbazide and 68 g. (0.44 mol) 2-bromo-propionic acid.

(c) 141.7 g. (0.623 mol) of 3-allyl-5-methyl-2,4-thiazolidinedione-2-(2-acetyl-hydrazone) is dissolved in 500 ml. of absolute ethanol and mixed with stirring at 35°, with 285 ml. of 0.67-n etherical hydrogen chloride. Subsequently the reactoin mixture is refluxed for 3 hours whereby after one and a half hours a crystalline slurry begins to precipitate. The mixture is then cooled to 5° and 500 ml. of petroleum/ether (B.P. 40–60°) is poured into it. The precipitated 3-allyl-5-methyl-2,4-thiazolidinedione-2-hydrazone-hydrochloride is filtered under suction and washed with 200 ml. of ether. The yield amounts to 108 g. (87.5% of theory), M.P. 167.5–169°.

In an analogous manner are prepared:

3-allyl-2,4-thiazolidinedione-2-hydrazone-hydrochloride, 27.6 g. (09%) of theory, starting from 32 g. (0.15 mol) of 3-allyl-2,4-thiazolidinedione-2-(2-acetyl-hydrazone);

3,5-dimethyl-2,4-thiazolidinedione-2-hydrazone - hydrochloride, M.P. 240° (decomposition), 3.36 g. (86% of theory), starting from 4 g. (0.02 mol) of 3,5-dimethyl-2,4-thiazolidinedione-2-(2-acetyl-hydrazone).

3-methyl-2,4-thiazolidinedione-2-hydrazone - hydrochloride, M.P. 260°, 7.87 g. (86.6% of theory), starting from 9.4 g. (0.05 mol) of 3-methyl-2,4-thiazolidinedione-2-(2-acetyl-hydrazone);

5-methyl-3-(2-methylallyl)-2,4-thiazolidinedione-2 - hydrazone-hydrochloride, M.P. 160–161°, 52.4 g. (81.9% of theory), starting from 65.5 g. (0.27 mol) of 5-methyl-3-(2-methylallyl)-2,4-thiazolidinedione-2-(2 - acetyl - hydrazone).

(d) To liberate the base 108 g. (0.486 mol) of 3-allyl-5-methyl-2,4-thiazolidinedione-2-hydrazone - hydrochloride are dissolved in 300 ml. of water and the solution is saturated with potassium carbonate with ice cooling. The oil which separates is taken up in a mixture of 150 ml. of methylene chloride and 150 ml. of petroleum/ether (B.P. 40–60°), separated from the aqueous phase and shaken with a solution of 50 g. of potassium carbonate in 150 ml. of water. The organic phase is separated and evaporated under reduced pressure. 88.4 g. (97.5% of theory) of 3-allyl-5-methyl-2,4-thiazolidinedione-2-hydrazone is obtained as an oil which crystallises on standing, M.P. 47–48°.

In an analogous manner are obtained:

3-allyl-2,4-thiazolidine-2-hydrazone as a colourless oil, 18.7 g. (73.5% of theory), starting from 27.6 g. (0.148 mol) of 3-allyl-2,4-thiazolidinedione-2-hydrazone hydrochloride.

3,5-dimethyl-2,4-thiazolidinedione-2 - hydrazone, M.P. 56–60°, 2.47 g. (90.4% of theory), starting from 3.36 g. (0.017 mol) of 3,5-dimethyl-2,4-thiazolidinedione-2 - hydrazone-hydrochloride;

3-methyl-2,4-thiazolidinedione-2-hydrazone, M.P. 99–100°, 4.6 g. (73% of theory), starting from 7.87 g. (0.043 mol) of 3-methyl-2,4-thiazolidinedione-2-hydrazone - hydrochloride;

5-methyl-3-(2-methylallyl)-2,4-thiazolidinedione-2 - hydrazone, 43.3 g. (97.5% of theory), starting from 52.4 g. (0.222 mol) of 5-methyl-3-(2-methylallyl)-2,4 - thiazolidinedione-2-hydrazone-hydrochloride.

(e) 13.1 g. (0.071 mol) of 3-allyl-5-methyl-2,4-thiazolidinedione-2-hydrazone and 7.4 g. (0.075 mol) of allylisothiocyanate are dissolved in 400 ml. of methanol, refluxed for 2 hours and the methanol is subsequently evaporated off under reduced pressure. The residue is recrystallised twice from chloroform-hexane, giving 16.5 g. (82.5% of theory) of 3-allyl-5-methyl-2,4-thiazolidinedione-2-(4-allyl-3-thiosemicarbazone), M.P. 106–108°.

In analogous manner are prepared:

3-allyl-5-methyl-2,4-thiazolidinedione-2-[4-(2 - methylallyl) - 3 - thiosemicarbazone], M.P. 67–69°, 14.1 g. (36.6% of theory), starting from 23.9 g. (0.129 mol) of 3-allyl-5-methyl-2,4-thiazolidinedione-2 - hydrazone and 16 g. (0.141 mol) of (2-methylallyl)-isothiocyanate;

3-allyl-5-methyl-2,4-thiazolidinedione-2-(4 - methyl - 3-thiosemicarbazone), M.P. 79–82°, 107.8 g. (87.3% of theory), starting from 88.4 g. (0.477 mol) of 3-allyl-5-methyl-2,4-thiazolidinedione - 2 - hydrazone and 38.4 g. (0.524 mol) of methylisothiocyanate;

3-allyl-5-methyl-2,4-thiazolidinedione-2-[4 - (2 - cyclohexene-1-yl)-3-thiosemicarbazone], M.P. 107–109°, 9.8 g. (70.8% of theory), starting from 7.9 g. (0.0426 mol) of 3-allyl-5-methyl-2,4-thiazolidinedione-2-hydrazone and 6.5 g. (0.047 mol) of (2-cyclohexene-1-yl)-isothiocyanate;

3,5-dimethyl-2,4-thiazolidinedione-2-(4-allyl - 3 - thiosemicarbazone), M.P. 115–116°, 10.7 g. (88.1% of theory), starting from 7.53 g. (0.047 mol) of 3,5-dimethyl-2,4-thiazolidinedione-2-hydrazone and allylisothiocyanate.

Example 9

The 3,5-dimethyl-2,4-thiazolidinedione-2-(2 - acetylhydrazone) used as starting material in Example 10(c) can also be prepared by the following method. The other starting materials in this reaction step can be prepared analogously.

(a) 6.7 g. (0.05 mol) of 4-acetyl-thiosemicarbazide [prepared according to E. Beyer et al. Ber. 85, 1122 (1952)], 8.5 g. (0.055 mol) of 2-bromo-propionic acid and 10.3 g. (0.125 mol) of anhydrous sodium acetate are dissolved in 50 ml. of absolute ethanol and refluxed for 4 hours. After cooling, the precipitated in organic salts are filtered off and washed with 20 ml. of ethanol. The filtrate is concentrated under reduced pressure. To the residue is added 150 ml. of brine and 15 ml. of 2-n sodium hydroxide solution. The resulting mixture is extracted for 48 hours with chloroform in a Kutscher-Steudl apparatus. The chloroform solution is evaporated and 6.9 g. of crude 5-methyl-2,4-thiazolidinedione-2-(2-acetyl-hydrazone) is obtained which melts, after two recrystallisations from isopropanol at 196–199°. The yield amounts to 5.7 g. (61% of theory).

(b) 0.93 g. (0.005 mol) of 5-methyl-2,4-thiazolidinedione-2-(2-acetyl-hydrazone) are dissolved in 15 ml. of dimethylformamide. To the solution is added with ice cooling in an atmosphere of nitrogen at 5°, 0.25 g. of a 50% sodium hydride dispersion in oil. The mixture is stirred between 5 and 20° until there is no further appreciable evolution of hydrogen. Subsequently 0.32 ml. (0.72 g., 0.0051 mol) of methyliodide are added dropwise with stirring and the reaction mixture is further stirred for 15 hours at room temperature. It is then added to 50 ml. of water and extracted with chloroform.

The chloroform solution is washed neutral with water, dried over sodium sulfate and evaporated under reduced pressure.

0.50 g. (50% of theory) of 3,5-dimethyl-2,4-thiazolidinedione-2 - (2 - acetyl-hydrazone), M.P. 176–177° (from chloroformhexane) are obtained.

Example 10

1.94 g. (0.008 mol) of 5-methyl-3-(2-methylallyl)-2,4-thiazolidinedione - 2 - (2-acetyl-hydrazone) [cp. Example 10(a) to 10(b)] are dissolved in 25 ml. of absolute ethanol, 2.5 ml. of concentrated hydrochloric acid is added and the solution is boiled for one hour under reflux. The reaction mixture is cooled and evaporated under reduced pressure. The residue of crude 5-methyl-3-(2-methylallyl)-2,4-thiazolidinedione-2-hydrazone hydrochloride is dissolved in 50 ml. of water and 7 g. of potassium carbonate added to liberate the base. The obtained alkaline solution is extracted with methylene chloride. After evaporating the methylene chloride solution 1.10 g. (68.5% of theory) of 5-methyl-3-(2-methylallyl)-2,4- thiazolidinedione-2-hydrazone is obtained as a colourless oil. [cp. Example 10(c) to 10(d).].

Example 11

(a) 18.9 g. (0.11 mol) of 3-allyl-2,4-thiazolidinedione-2-hydrazone (see Example 10) are dissolved in 280 ml. of water and with ice cooling and stirring 5.8 g. (0.055 mol) of sodium carbonate are added. At a reaction temperature of 3 to 5° cyanogen chloride is introduced until the solution reaches pH 7. The precipitated 3-(3-allyl-4-oxo-2-thiazolidinylidene)-carbazic acid nitrile is filtered under suction and washed with 30 ml. of water. After drying for 15 hours at 40° under reduced pressure, the yield amounts to 14.5 g. (67.1% of theory), M.P. 155° (with decomposition).

(b) 14.5 g. (0.074 mol) of 3-(3-allyl-4-oxo-2-thiazolidinylidene)-carbazic acid nitrile are suspended in 250 ml. of ethanol and saturated with stirring at 10 to 15° with ammonia. Subsequently hydrogen sulfide is passed into the solution to saturation at 3 to 5°. The reaction mixture is then stirred for 15 hours at 20° and subsequently evaporated under reduced pressure. The residue is treated with 50 ml. of isopropanol and 15 ml. of absolute ethanol, stirred for about one hour and then filtered under suction. The solid collected is recrystallised twice from dimethylformamide-ether. 4.7 g. (28% of theory) of 3-allyl-2,4-thiazolidinedione-2-(3-thiosemicarbazone), M.P. 187–187.5° is obtained.

Example 12

47.0 g. (0.1725 mol) of 3-(2-methylallyl)-5-methyl-2,4 - thiazolidinedione-2-(4-methyl-3-thiosemicarbazone), 17.9 g. (0.19 mol) of chloroacetic acid and 35.4 g. (0.431 mol) of anhydrous sodium acetate are boiled under reflux and stirring for 3 hours with 400 ml. of n-proponol.

The reaction mixture is treated with 700 ml. of water and allowed to cool to room temperature. The precipitated 2,2'-azine of 3-methyl-2,4-thiazolidinedione and of 3-(2-methylallyl)-5-methyl-2,4-thiazolidinedione is filtered off and washed with 300 ml. of water. After one recrystallisation from methylenechloride-hexane, 40.5 g. (78–1% of theory) of the pure azine, M.P. 154°, is obtained.

In an analogous manner are prepared:

The 2,2'-azine of 3-allyl-5-methyl-2,4-thiazolidinedione and of 3-methyl-2,4-thiazolidinedione, M.P. 166–167°, 8.6 g. (55% of theory), starting from 13.5 g. (0.052 mol) of 3-allyl-5-methyl-2,4-thiazolidinedione-2-(4 - methyl-3-thiosemicarbazone), 5.4 g. (0.057 mol) of chloroacetic acid and 10.7 g. (0.131 mol) of anhydrous sodium acetate;

The 2,2'-azine of 3,5-dimethyl-2,4-thiazolidinedione and of 3-(2-methylallyl) - 2,4 - thiazolidinedione, M.P. 174–175°, 10.7 g. (79% of theory), starting from 12.0 g. (0.044 mol) of 3,5-dimethyl-2,4-thiazolidinedione-2-[4-(2-methylallyl)-3-thiosemicarbazone], 4.5 g. (0.048 mol) of chloroacetic acid and 9.1 g. (0.110 mol) of anhydrous sodium acetate;

The 2,2'-azine of 3-allyl-5-methyl-2,4-thiazolidinedione and of 3-(2-methylallyl)-2,4-thiazolidinedione, M.P. 178–179°, 14.0 g. (61.9% of theory), starting from 20.0 g. (0.067 mol) of 3-allyl-5-methyl-2,4-thiazolidinedione-2-[4-(2-methylallyl)-3-thiosemicarbazone], 6.9 g. (0.074 mol) of chloroacetic acid and 13.8 g. (0.167 mol) of anhydrous sodium acetate;

The 2,2'-azine of 3-allyl-2,4-thiazolidinedione and of 3,5-dimethyl-2,4-thiazolidinedione, M.P. 164–166°, 12.0 g. (74.1% of theory), starting from 14.1 g. (0.055 mol) of 3,5-dimethyl - 2,4 - thiazolidinedione-2-(4-allyl-3-thiosemicarbazone), 5.6 g. (0.060 mol) of chloroacetic acid and 11.2 g. (0.137 mol) of anhydrous sodium acetate;

The 2,2'-azine of 3-methyl-2,4-thiazolidinedione and of 3-(2-methylallyl)-5-methyl - 2,4 - thiazolidinedione, M.P. 153.5–154.5°, 11.5 g. (92.7% of Theory) is obtained in an analogous manner starting from 10 g. (0.040 mol) of 3-methyl-2,4-thiazolidinedione-2-[4-(2-methylallyl)-3-thiosemicarbazone], 7.3 g. (0.048 mol) of 2-bromopropionic acid and 8.2 g. (0.100 mol) of anhydrous sodium acetate.

Examples for the production of tablets and dragées are given below:

Example 13

250 g. of active substance, e.g. 2,2'-azine of 5-methyl-2,4-thiazolidinedione and of 5-methyl-3-(1-methylallyl)-2,4-thiazolidinedione, are mixed with 175.80 g. of lactose and 169.70 g. of potato starch. The mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicon dioxide are mixed in and the mixture is pressed into 10,000 tablets each weighing 100 mg. and containing 25 mg. of active substance. If desired, the tablets can be grooved for better adaptation of the dosage.

Example 14

A granulate is produced from 250 g. of active substance, e.g. 2,2'-azine of 2,4-thiazolidinedione and of 3-(1-methylallyl)2,4-thiazolidinedione, 175.90 g. of lactose and the alcoholic solution of 10 g. of stearic acid. After drying, the granulate is mixed with 56.60 g. of colloidal silicon dioxide, 165 g. of talcum, 20 g. of potato starch and 2.50 g. of magnesium stearate and pressed into 10,000 dragée cores. These are then coated with a concentrated syrup made from 502.28 g. of crystallised saccharose, 200 g. of talcum, 6 g. of shellac, 10 g. of gum arabic, 0.22 g. of dyestuff and 1.5 g. of titanium dioxide and dried. The dragées obtained each weight 140 mg. and contain 25 mg. of active substance.

What we claim is:

1. A compound of the formula

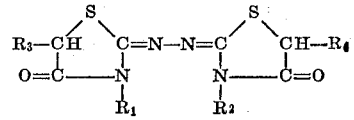

wherein
$R_1$ is hydrogen, methyl, allyl 2-methallyl, or 2-propinyl;
$R_2$ is alkenyl having 3 to 4 carbon atoms, 2-cyclohexenyl or 2-propinyl; and
each of $R_3$ and $R_4$ independent of the other is hydrogen or methyl.

2. A compound as defined in claim 1, wherein $R_1$ is hydrogen, $R_2$ is 1-methylallyl, and each of $R_3$ and $R_4$ is hydrogen.

3. A compound as defined in claim 1, wherein $R_1$ is hydrogen, $R_2$ is 1-methylallyl, and each of $R_3$ and $R_4$ is methyl.

4. A compound as defined in claim 1, wherein $R_1$ is methyl, $R_2$ is 1-methylallyl, and each of $R_3$ and $R_4$ is methyl.

5. A compound as defined in claim 1, wherein $R_1$ is methyl, $R_2$ is allyl, and each of $R_3$ and $R_4$ is hydrogen.

6. A compound as defined in claim 1, wherein $R_1$ is methyl, $R_2$ is allyl, and each of $R_3$ and $R_4$ is methyl.

7. A compound as defined in claim 1, wherein $R_1$ is allyl, $R_2$ is allyl, and each of $R_3$ and $R_4$ is hydrogen.

8. A compound as defined in claim 1, wherein $R_1$ is hydrogen, $R_2$ is 2-methylallyl, and each of $R_3$ and $R_4$ is methyl.

9. A compound as defined in claim 1, wherein $R_1$ is methyl, $R_2$ is 2-methylallyl, and each of $R_3$ and $R_4$ is methyl.

10. A compound as defined in claim 1, wherein $R_1$ is hydrogen, $R_2$ is 2-cyclohexenyl and each of $R_3$ and $R_4$ is methyl.

11. A compound as defined in claim 1, wherein $R_1$ is allyl, $R_2$ is 2-methylallyl, and each of $R_3$ and $R_4$ is hydrogen.

12. A compound as defined in claim 1, wherein each of $R_1$ and $R_2$ is 2-propinyl, and each of $R_3$ and $R_4$ is methyl.

13. A compound as defined in claim 1, wherein $R_1$ is methyl, $R_2$ is allyl, $R_3$ is hydrogen and $R_4$ is methyl.

14. A compound as defined in claim 1, wherein $R_1$ is methyl, $R_2$ is 2-methylallyl, $R_3$ is hydrogen and $R_4$ is methyl.

15. A compound as defined in claim 1, wherein $R_1$ is methyl, $R_2$ is 2-propinyl, and each of $R_3$ and $R_4$ is hydrogen.

16. A compound as defined in claim 1, wherein $R_1$ is methyl, $R_2$ is 2-methylallyl, $R_3$ is methyl and $R_4$ is hydrogen.

17. A compound as defined in claim 1, wherein $R_1$ is allyl, $R_2$ is 2-methylallyl, $R_3$ is methyl and $R_4$ is hydrogen.

18. A compound as defined in claim 1, wherein $R_1$ is methyl, $R_2$ is allyl, $R_3$ is methyl and $R_4$ is hydrogen.

19. A compound as defined in claim 1, wherein $R_1$ is allyl, $R_2$ is allyl, $R_3$ is methyl and $R_4$ is hydrogen.

20. A compound as defined in claim 1, wherein each of $R_1$ and $R_2$ is 2-methylallyl, and each of $R_3$ and $R_4$ is hydrogen.

References Cited
UNITED STATES PATENTS 3,175,905   3/1965   Stahlhofen et al. ___ 260—306.7

OTHER REFERENCES

Bulka et al., Chem. Abstracts, 61:5650–1 Aug. 31, 1964.

Gagnon et al., Chem. Abstracts, 55:22289 Oct. 30, 1964.

Kalle A-G, Chem. Abstracts, 58:11506–7 May 27, 1963.

ALEX MAZEL, Primary Examiner

R. J. GALLAGHER, Assistant Examiner

U.S. Cl. X.R.

260—181 R; 474—270